Figure 1:
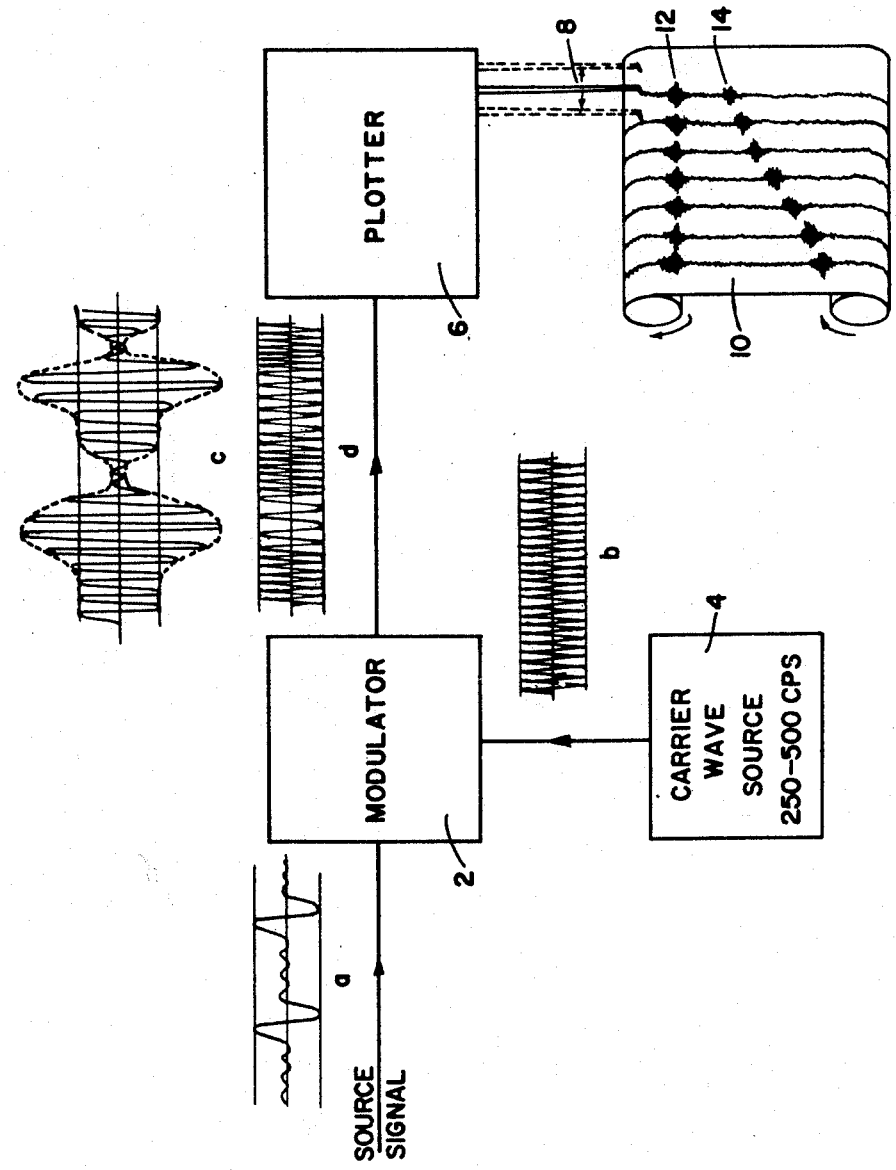

United States Patent Office 3,133,782
Patented May 19, 1964

3,133,782
MODULATED STYLUS RECORDING OF TRANSIENT SIGNALS
John P. Woods, Dallas, Tex., assignor to The Atlantic Refining Company, Philadelphia, Pa., a corporation of Pennsylvania
Filed June 17, 1958, Ser. No. 742,565
18 Claims. (Cl. 346—1)

The present invention relates to a novel method and apparatus for modulated stylus recording of transient signals. More specifically, the present invention concerns the recording of transient signals by means of a stylus-type recorder in which the density or width of the trace varies in proportion to the signal variations. Still more specifically, the present invention is directed to the recordation of seismic signals obtained in geophysical exploration to produce variable density, or variable width, cross section plots of seismic signals.

One method of exploring subsurface earth formations which has had wide and extensive use for some time is known as seismic prospecting. This method comprises creating elastic waves at a selected point on or adjacent to the earth's surface and detecting reflected or refracted elastic waves at a plurality of points displaced from the source of energy after reflection or refraction from subsurface strata due to discontinuities in the elastic wave transmitting properties of the various strata. Generally the detection of reflected or refracted elastic waves is accomplished by placing on the surface of the earth sensitive instruments known as seismometers or geophones which translate the elastic waves into equivalent electrical signals, which signals are then recorded as a plurality of traces on a seismograph or seismic record. The geophones may be spaced from the source of energy in various patterns depending upon the exploratory area to be covered and the type of information to be obtained. By simultaneously recording on the seismogram suitable timing signals, it is possible to determine the travel time from the source of energy to the subsurface strata and back to the surface of the earth. With this travel time information, together with other previously measured or calculated information, such as, elastic wave velocity through the near surface and subsurface strata, it is then possible to calculate the depth below the surface of the earth, and the attitude or curvature of various subsurface strata under investigation.

It is the usual practice to employ a recording oscillograph to record the electrical signals from the geophones in visible form. Although not quite as prevalent, it is also possible to record the electrical signal by a recorder equipped with a moving stylus, such as, a pen and ink recorder, an electrographic recorder, a thermographic recorder or the like. More recently, the electrical signals have been recorded in invisible form by magnetic recording means and then converted to visible form. Irrespective of the type of recording, the recorded electrical signal varies in amplitude in accordance with the received elastic wave amplitudes; and, by inspection of a visible trace or correlation of a plurality of visible traces, it is possible to pick out prominent features or to follow prominent features across a plurality of traces recorded over an extended area. For the latter purpose, it is desirable to eliminate certain known errors from the signals recorded and to plot a plurality of signals from a single seismic record or a plurality of seismic records on a single sheet to obtain a cross section plot which, in essence, will depict a two-dimensional, vertical section of the subsurface showing the depth and attitude or curvature of the subsurface strata. While the inspection of individual seismic traces or the inspection of a cross section plot of a plurality of seismic traces is comparatively simple in good record areas, the inspection and interpretation can many times become extremely difficult because of the complexity of the signals recorded. More recently, systems have been employed in which the detected elastic waves are recorded in the form of variable density or variable area photographic records which can be more readily interpreted. Suitable means for variable density or variable area photographic recording are described in United States Patent No. 2,051,153 to Frank Reiber.

Although variable density or variable area photographic records are extremely helpful in the interpretation and presentation of seismic information, the systems required to produce such records by photographic means are obviously extremely complicated and expensive, and the process is time-consuming. For example, it has been the usual practice in variable density photographic recording to employ an incandescent lamp that varies in brightness in accordance with variations in the amplitude of the signal being sent to it. Such lamps must be carefully selected; require considerable space, thereby limiting the closeness with which a plurality of signals may be recorded; and are subject to considerable variation due to changes in circuit constants of the lamp system. In addition, any such system of photographic recording, irrespective of how simple or how accurate, requires an additional step of developing the record which, in itself, is time-consuming and expensive.

It is, therefore, an object of the present invention to provide a simple method and apparatus for recording transient signals in the form of variable density or variable width records without the necessity of employing photographic recording apparatus.

Another and further object of the present invention is to provide a simple method and apparatus for recording transient signals with a stylus-type recorder to produce a variable density or variable width record.

Another and further object of the present invention is to provide a method and apparatus whereby a variable density or variable width seismic cross section map can be plotted by a moving stylus recorder.

In accordance with the present invention, a transient signal to be recorded is employed to modulate a high frequency carrier signal and the modulated carrier signal is then applied to the moving stylus of a stylus-type recorder. By modulating a high frequency carrier wave by amplitude modulation, frequency modulation, or the like, the moving stylus can be made to produce a record which varies in width, in the case of the amplitude modulated signal, or in density, in the case of a frequency modulated signal, and the resultant record is strikingly similar to the records heretofore produced by the more expensive and delicate photographic means. As applied to the preparation of a seismic cross section plot, a record of a plurality of such modulated signals in close side-by-side relationship depicts the same contrasting light and dark areas as that which can be produced by the prior art photographic means.

Figure 2:
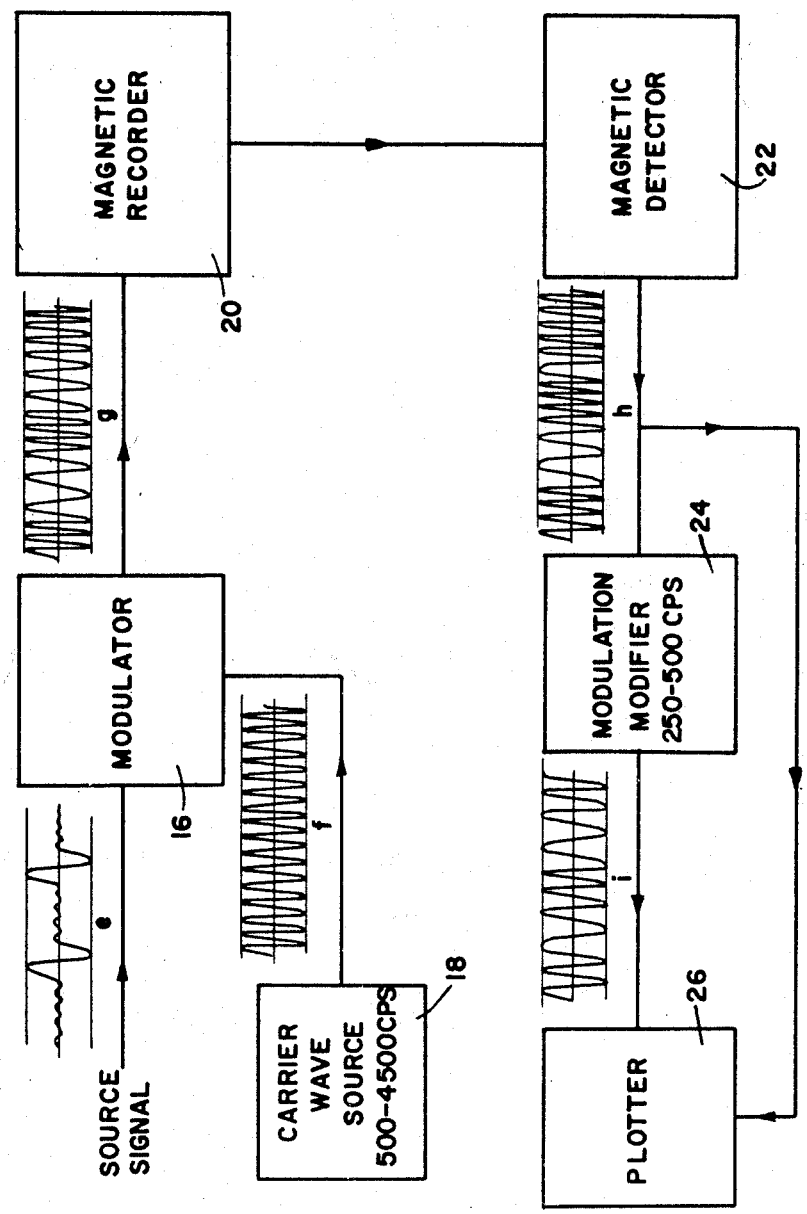

Other objects and advantages of the present invention will be apparent to those skilled in the art when reference is made to the accompanying drawings, in which:

FIGURE 1 is a block diagram of a system for producing a variable density or variable width representation of a transient signal, and FIGURE 2 is a block diagram of a system for producing a variable density plot of a transient signal involving the intermediate step of magnetic recording.

Referring specifically to FIGURE 1, a source signal, such as that shown by waveform a, is fed to a suitable modulator 2 of conventional design. As previously indicated, this modulator may take various forms, such as, an amplitude modulator, a frequency modulator, or the like. Simultaneously with the introduction to modulator 2 of the source signal, a high frequency carrier wave having the form of waveform $b$ is fed to modulator 2 from carrier wave source 4. For reasons which will appear hereinafter, the carrier wave preferably has a frequency in the range of 250 to 500 cycles per second. Modulator 2 produces a composite signal having the form of waveform $c$, if the source signal is employed to amplitude modulate the carrier wave, or the composite waveform $d$, if the source signal frequency modulates the carrier wave. The modulated carrier wave is then fed to plotter 6 where this signal is employed to operate moving stylus 8 of a direct recorder. Stylus 8 may be a pen element, an electrographic stylus, a thermographic stylus or any other direct writing device which moves transversely with respect to the movement of a moving record sheet 10 in accordance with variations in the signal being recorded. For example, a solenoid-type pen manufactured by the Massa Division of Cohu Electronics, Incorporated "Oscillograph Model M–133" is suitable. In this instance, the frequency or amplitude modulated signal is fed directly to the coil of the solenoid. For purposes of illustration, record sheet 10 shows a draftsman's representation of a seismic cross section plot of a plurality of closely spaced, amplitude modulated signals of waveform $a$. As drawn, reflections from a substantially horizontal reflecting horizon are shown at 12 and reflections from a dipping reflecting horizon at 14. Cross section plot 10, of course, assumes that the individual seismic traces have been time corrected to eliminate known time errors which are present in the signals as originally detected. Such corrections have, in the past, been made by hand after tedious computation and replotting. However, very recently, analog and digital type computers have been developed which automatically correct individual seismic traces to eliminate the known time errors and produce a cross section plot with all traces placed on a true time scale and aligned in their proper time relationship. It is, therefore, obvious that the present method and apparatus for recording seismic signals is particularly adapted for use in the preparation of a cross section plot by present-day seismic record computers.

It has also become quite prevalent in recent years to record seismic signals on magnetic tape because of the permanence of such records and the flexibility provided for correcting the records in automatic seismic record correctors for modifying the signals in any other manner as an aid to interpretation. There are various means of recording on magnetic tape or magnetic sheets mounted on a drum, depending upon the preference of the operator. In other words, such magnetic recording may be a direct recording of the electrical signal from the geophone, a recording in which the geophone signal frequency modulates a carrier, a recording in which the geophone signal amplitude modulates a carrier, or recordings in which the geophone signal modulates a carrier in some other manner. As will be seen by reference to FIGURE 2, the present method of producing a variable density or variable width recording of electrical signals is well adapted for use as a part of a magnetic recording system or in the translation or rerecording of electrical signals recorded on magnetic tape. Referring now to FIGURE 2, waveform $e$ represents a section of a seismic signal referred to as a source signal herein. This source signal is fed to a suitable modulator 16 which, in the case illustrated, is a frequency modulator but may take any other suitable form. Simultaneously with the introduction of the source signal to modulator 16, a high frequency carrier wave from carrier wave source 18 is fed to modulator 16. The carrier wave produced by carrier wave source 18 preferably has a frequency within the range of 500 to 4500 cycles per second and will have the form of waveform $f$. The composite signal produced by modulator 16 would have the configuration of waveform $g$. This frequency modulated signal is then fed to a conventional magnetic recorder 20 which records the signal on a magnetic tape or a magnetic sheet placed about a cylindrical drum. The invisible signal of waveform $g$ is then picked off the magnetic recording surface by a conventional magnetic detector 22 which reconverts magnetically recorded information to an electrical signal having the form of waveform $h$ and is substantially the same as waveform $g$. Inasmuch as the preferred form of magnetic recording of a frequency modulated seismic signal requires that the carrier wave $f$ have a comparatively high frequency, it is generally desirable that the modulated signal be modified to reduce the carrier frequency to a range which can be conveniently handled by present-day moving stylus type recorders. Therefore, the electrical signal of waveform $h$ is fed to a modulation modifier 24 which, in the case of a frequency modulated signal, is a frequency divider adapted to reduce the frequency of the modulated signal to produce a signal of waveform $i$. The signal having waveform $i$ is then fed to plotter 26, which is the same as plotter 6 of FIGURE 1, and therein operates the moving stylus of the plotter to produce a direct recording in the form of a variable density recording. As was pointed out in the discussion of FIGURE 1, the signal passed to the recorder should have a carrier wave frequency ranging from about 250 to 500 cycles per second in order to permit the use of inexpensive and conventional moving stylus type recorders.

Although the present invention has been described with particular reference to the presentation of variable width or variable density traces of seismic signals, it should be understood that the present method and apparatus may be similarly applied to the recordation and presentation of any transient signal. Other variations than those specifically shown will also be apparent to those skilled in the art without departing from the present invention. For example, where a magnetically recorded signal such as a frequency modulated signal is detected from the magnetic recording surface, in some cases it may not be necessary to reduce the frequency of the carrier and the detected frequency modulated signal may be recorded directly, while in other cases it may be desirable to multiply or increase the frequency of the carrier. It will also be obvious that the present method and apparatus is applicable to the presentation and recording of transient signals other than seismic signals, such as well logging signals or the like where interpretation of such signal will be aided by presentation of the signals in the form of a variable width or variable density type of trace.

I claim:

1. A method of recording seismic signals having a frequency range below about 100 cycles per second comprising supplying a carrier signal having a frequency substantially above the frequency range of said seismic signals but below a frequency of about 500 cycles per second, separately modulating said carrier signal with each of said seismic signals, vibrating a direct-contact writing element in accordance with the oscillations of the modulated carriers and moving a recording medium at a predetermined rate at right angles to the direction of vibration of said writing element.

2. A method in accordance with claim 1 wherein the carrier signal is amplitude modulated with the seismic signals.

3. A method in accordance with claim 1 wherein the carrier signal is frequency modulated with the seismic signals.

4. A method in accordance with claim 1 wherein the frequency of the carrier signal is above about 250 cycles per second.

5. A method in accordance with claim 1 wherein the modulated carriers are recorded in side-by-side relationship to one another to produce a seismic cross section plot.

6. In a method of recording seismic signals initially having a frequency range below about 100 cycles per second wherein said seismic signals are utilized to modulate a carrier having a frequency substantially above 500 cycles per second and the modulated carriers are magnetically recorded on a ferromagnetic recording medium, the improvement comprising detecting said modulated carriers and converting the same to electrical signals, reducing the frequency of said detected, modulated carriers to a frequency below about 500 cycles per second but above the initial frequency range of said seismic signals, vibrating a direct-contact writing element in accordance with the oscillations of the modulated carriers of reduced frequency and moving a recording medium at a predetermined rate at right angles to the direction of vibration of said writing element.

7. A method in accordance with claim 6 wherein the carrier signal is amplitude modulated with the seismic signals.

8. A method in accordance with claim 6 wherein the carrier signal is frequency modulated with the seismic signals.

9. A method in accordance with claim 6 wherein the frequency of the detected, modulated carriers is reduced to a frequency above about 250 cycles per second.

10. A method in accordance with claim 6 wherein the modulated carriers of reduced frequency are recorded in side-by-side relationship to one another to produce a seismic cross section plot.

11. A system for recording seismic signals having a frequency range below about 100 cycles per second, comprising a constant frequency carrier wave source adapted to produce a carrier signal having a frequency substantially above the frequency range of said seismic signals but below a frequency of about 500 cycles per second, modulator means adapted to receive the output of said carrier wave source and modulate said output with said seismic signals direct contact recording means having a stylus operatively connected to the output of said modulator means and adapted to vibrate laterally in response to the oscillations of said output of said modulator means, and means for moving a recording medium at a predetermined rate at right angles to the direction of vibration of said stylus.

12. A system in accordance with claim 11 wherein the direct contact recording means is a pen and ink recorder.

13. A system in accordance with claim 11 wherein the direct contact recording means is an electrographic recorder.

14. A system in accordance with claim 11 wherein the direct contact recording means is a thermographic recorder.

15. A system for recording seismic signals initially having a frequency range below about 100 cycles per second and which have been utilized to modulate a carrier signal having a frequency above about 500 cycles per second and magnetically recorded on a ferromagnetic medium as such modulated carriers comprising means for detecting said modulated carriers and converting the same to electrical signals, modulation modifier means adapted to reduce the frequency of said modulated carriers to a frequency of less than about 500 cycles per second but above the initial frequency range of said seismic signals, direct contact recording means having a stylus operatively connected to the output of said modulation modifier means and adapted to vibrate laterally in response to the oscillations of said output of said modulation modifier means, and means for moving a recording medium at a predetermined rate at right angles to the direction of vibration of said stylus.

16. A system in accordance with claim 15 wherein the direct contact recording means is a pen and ink recorder.

17. A system in accordance with claim 15 wherein the direct contact recording means is an electrographic recorder.

18. A system in accordance with claim 15 wherein the direct contact recording means is a thermographic recorder.

References Cited in the file of this patent

UNITED STATES PATENTS

| 1,597,487 | St. Clair | Aug. 24, 1926 |
| 2,378,389 | Begun | June 19, 1945 |
| 2,466,691 | Daniels | Apr. 12, 1949 |
| 2,644,738 | Gardner | July 7, 1953 |
| 2,726,131 | Skelton | Dec. 6, 1955 |
| 2,757,357 | Peterson | July 31, 1956 |
| 2,803,515 | Begun et al. | Aug. 20, 1957 |
| 2,876,428 | Skelton et al. | Mar. 3, 1959 |
| 2,946,645 | Schwarzer | July 26, 1960 |